United States Patent
Desjardien et al.

(10) Patent No.: US 10,303,154 B2
(45) Date of Patent: May 28, 2019

(54) SURFACE BASED HOLE TARGET FOR USE WITH SYSTEMS AND METHODS FOR DETERMINING A POSITION AND A VECTOR OF A HOLE FORMED IN A WORKPIECE

(71) Applicant: The Boeing Company, Chicago, IL (US)

(72) Inventors: Matthew Desjardien, Chicago, IL (US); Joel Adriance, Chicago, IL (US)

(73) Assignee: The Boeing Company, Chicago, IL (US)

( * ) Notice: Subject to any disclaimer, the term of this patent is extended or adjusted under 35 U.S.C. 154(b) by 267 days.

(21) Appl. No.: 15/290,190

(22) Filed: Oct. 11, 2016

(65) Prior Publication Data

US 2018/0101160 A1  Apr. 12, 2018

(51) Int. Cl.
| | | |
|---|---|---|
| *G05B 19/402* | (2006.01) | |
| *G05B 13/04* | (2006.01) | |
| *G06T 7/00* | (2017.01) | |
| *G01B 11/00* | (2006.01) | |
| *G01B 11/25* | (2006.01) | |
| *G06T 7/73* | (2017.01) | |

(52) U.S. Cl.
CPC .......... *G05B 19/402* (2013.01); *G01B 11/002* (2013.01); *G01B 11/2513* (2013.01); *G05B 13/042* (2013.01); *G06T 7/0004* (2013.01); *G06T 7/75* (2017.01); *G05B 2219/35036* (2013.01); *G06T 2207/30164* (2013.01)

(58) Field of Classification Search
None
See application file for complete search history.

(56) References Cited

U.S. PATENT DOCUMENTS

| 4,791,482 A | 12/1988 | Barry et al. | |
|---|---|---|---|
| 8,961,017 B2 * | 2/2015 | Muilenburg | ............... B23P 6/00 138/167 |

(Continued)

FOREIGN PATENT DOCUMENTS

| EP | 3309503 | 4/2018 |
|---|---|---|
| WO | WO 02/097362 | 12/2002 |

OTHER PUBLICATIONS

Extended European Search Report prepared by the European Patent Office in application No. EP 17 18 5384 dated Feb. 22, 2018.

*Primary Examiner* — Tuan C Dao
(74) *Attorney, Agent, or Firm* — McDonnell Boehnen Hulbert & Berghoff LLP

(57) ABSTRACT

In examples, systems for determining a position and a vector of a hole formed in a workpiece based on scanned data of the workpiece are described. The system includes a target for coupling to the hole formed in the workpieced, a scanner for projecting a light pattern onto the target and surrounding workpiece and for generating a plurality of data points representative of a surface area of a cylinder body of the target, and a processor for receiving the plurality of data points generated by the scanner and generating a three-dimensional (3D) model of at least a portion of the workpiece. The processor determines a position and a vector of the hole formed in the workpiece for the 3D model based on the plurality of data points representative of the surface area of the cylinder body.

19 Claims, 7 Drawing Sheets

(56) References Cited

U.S. PATENT DOCUMENTS

| | | | |
|---|---|---|---|
| 2004/0047586 A1* | 3/2004 | Schick | F41G 1/30 385/147 |
| 2005/0247026 A1* | 11/2005 | Griggs | A22C 11/125 53/131.4 |
| 2008/0123112 A1 | 5/2008 | Marsh et al. | |
| 2009/0056273 A1* | 3/2009 | Ferro De La Cruz | E04G 17/06 52/749.1 |
| 2009/0151646 A1* | 6/2009 | Crawford | A01K 1/0107 119/169 |
| 2011/0203915 A1* | 8/2011 | McClure | B01D 1/0035 203/3 |
| 2012/0251679 A1* | 10/2012 | Ferry | B65D 1/26 426/130 |
| 2014/0090555 A1* | 4/2014 | Yang | F15B 15/226 92/85 B |
| 2016/0037803 A1* | 2/2016 | Tumagyan | A23N 17/005 426/11 |
| 2016/0116911 A1* | 4/2016 | Yamamoto | G06F 17/30958 700/98 |

* cited by examiner

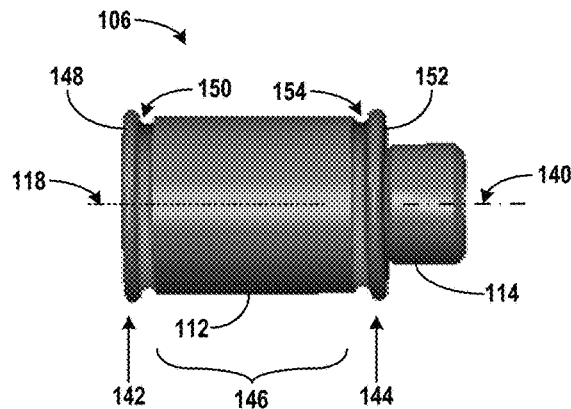
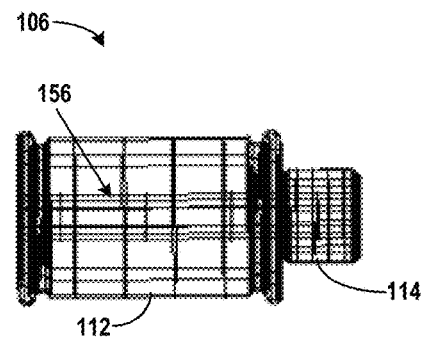
FIG. 2  FIG. 3
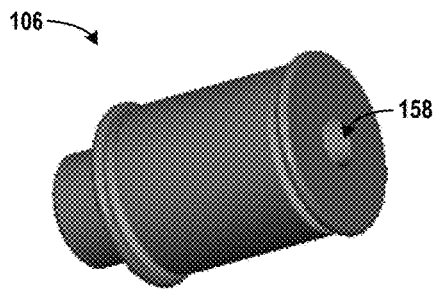
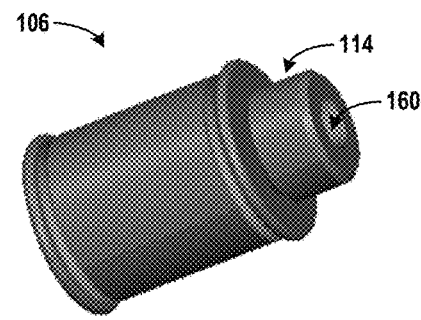
FIG. 4  FIG. 5
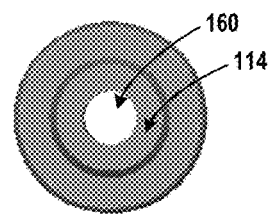
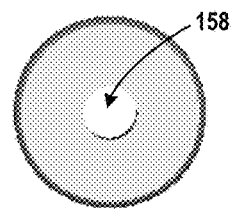
FIG. 6  FIG. 7

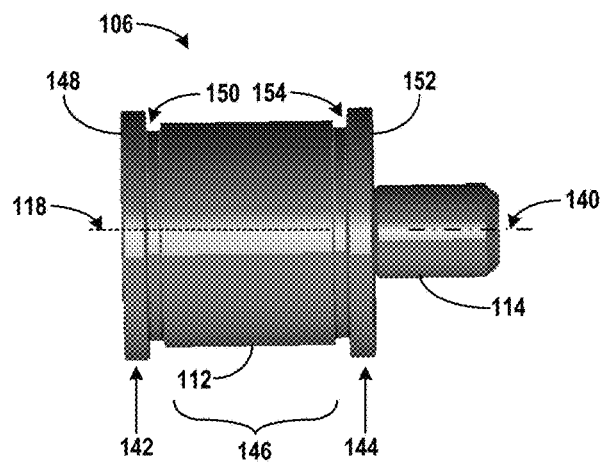
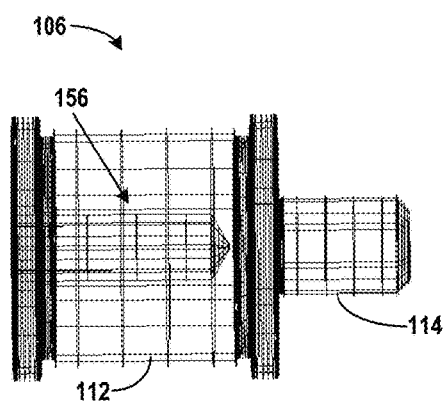
FIG. 8  FIG. 9
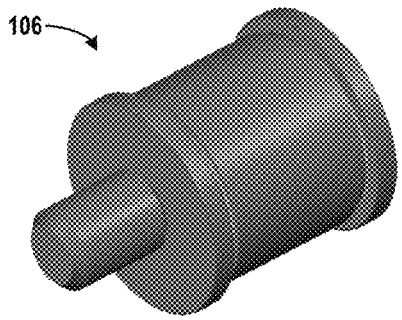
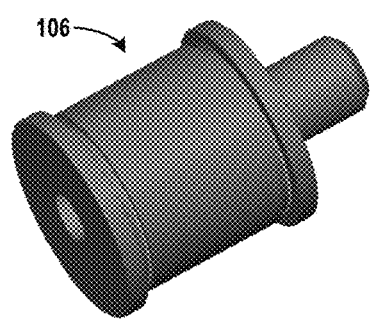
FIG. 10  FIG. 11
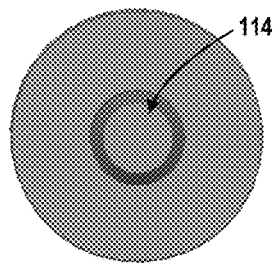
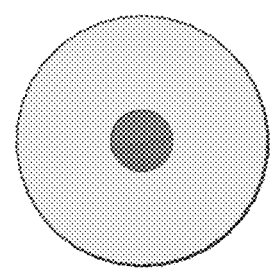
FIG. 12  FIG. 13

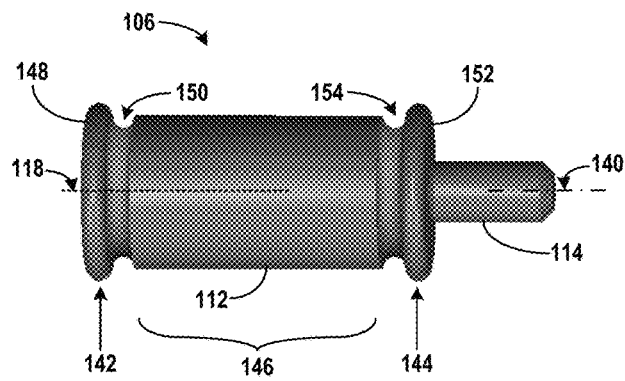
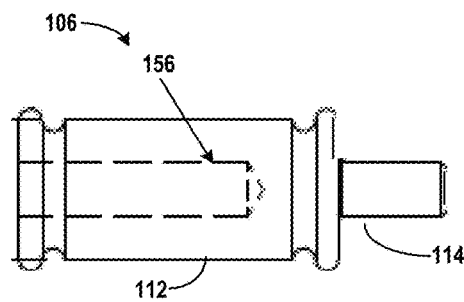
FIG. 14    FIG. 15
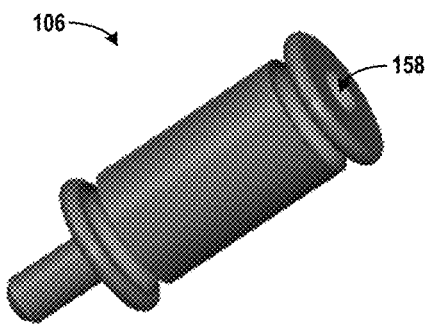
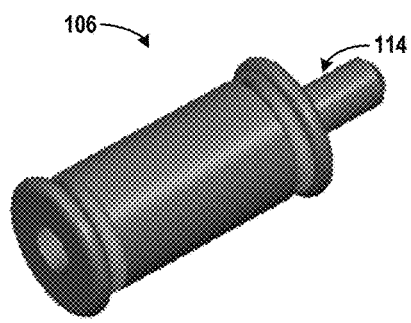
FIG. 16    FIG. 17
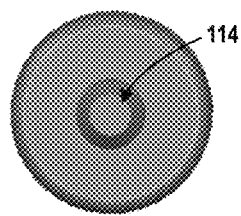
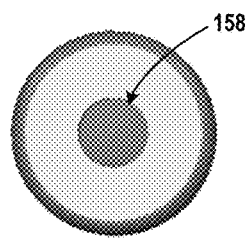
FIG. 18    FIG. 19

SURFACE BASED HOLE TARGET FOR USE WITH SYSTEMS AND METHODS FOR DETERMINING A POSITION AND A VECTOR OF A HOLE FORMED IN A WORKPIECE

FIELD

The present disclosure relates generally to three-dimensional (3D) modeling of workpiece components, and more particularly to, a surface based target for insertion into a hole formed in a workpiece enabling highly accurate determination of a position of the hole and a vector of the hole within scanned data of the workpiece.

BACKGROUND

During manufacture of items that include an assembly of components or workpieces, often a three-dimensional (3D) model of each component is generated, and then the components are virtually assembled using the 3D models to assess the manufactured item prior to actually building the item.

A 3D model of a component may be generated using a structured light scanner to scan the component. When the component includes a hole, such as a drilled hole for attaching a fitting for example, a target is generally attached or coupled to the hole during the scanning process to enable identification of a location or position of the hole within the scanned data as well as determination of a hole vector. The position of the hole may be necessary to enable virtual assembly of the components that are scanned separately so that the components are lined up by the holes for coupling.

Existing photogrammetry targets for use in determining hole position and hole vectors can create some uncertainty in hole position due to the fact that the targets generally use only one to two scanned points to generate a vector. For instance, with a single-point target, projection of a location of the scanned single point target can offer error if the hole is not normal to the local surface due to only one scanned data point. With two-point targets, the use of two scanned points to generate a line to define a centerline of the target for the vector hole position is possible, but this can lead to error in a predicted surface position and direction of the hole to the extent that one of the points becomes blocked or shadowed. In addition, with either the single or two point target, the target should be properly oriented relative to the scanner, otherwise, the scanner may introduce some inaccuracies in the vector calculation.

Using a structured light scanner to scan a component without use of a target can be performed to try to find a position of a hole, but determination of the hole position and hole vector would be difficult and lack high accuracy due to unknown direction and/or orientation of the hole. Other factors that may affect the difficulty include that the structured light scanner may not detect reflective surfaces that typically remain after machining holes when the components are metal, and for holes of a smaller size it can be difficult to capture enough interior surface data to compute an accurate hole position and hole vector.

What is needed is a scanning target for use with surface scanners, such as structured light scanners, that enables determination of the position and vector of holes within components to a high degree of accuracy.

SUMMARY

In one example, a system is described for determining a position and a vector of a hole formed in a workpiece based on scanned data of the workpiece. The system comprises a target for coupling to the hole formed in the workpiece, and target comprises a cylinder body extending from a shaft. The shaft couples to the hole and the cylinder body extends from the hole such that a centerline of the hole is collinear with a longitudinal axis of the cylinder body. The system also comprises a scanner for projecting a light pattern onto the target and surrounding workpiece and for generating a plurality of data points representative of a surface area of the cylinder body. The system also comprises a processor for receiving the plurality of data points representative of the surface area of the cylinder body generated by the scanner and generating a three-dimensional (3D) model of at least a portion of the workpiece. The processor determines a position of the hole and a vector of the hole formed in the workpiece for the 3D model based on the plurality of data points representative of the surface area of the cylinder body.

In another example, a target is described for coupling to a hole formed in a workpiece and for use with a scanner in determining a position and a vector of the hole in scanned data. The target comprises a shaft for coupling to the hole and having a centerline extending longitudinally along the shaft, and the shaft couples to the hole such that a centerline of the hole is collinear with the centerline of the shaft. The target also comprises a cylinder body extending from the shaft such that a centerline of the cylinder body aligns with the centerline of the shaft, and the cylinder body includes two parallel circular faces having volume therebetween. The cylinder body includes a cavity, and the centerline of the cylinder body extends longitudinally along the cylinder body between the two parallel circular faces. The position and the vector of the hole is based on an intersection of the centerline of the cylinder body with the centerline of the shaft. The target also comprises a first ring structure coupled to an end of the cylinder body and including an undercut on a portion connected to the cylinder body, and a second ring structure positioned between the cylinder body and the shaft, and including an undercut on a portion connected to the cylinder body.

In another example, a method is described for determining a position and a vector of a hole formed in a workpiece based on scanned data of the workpiece. The method comprises causing a scanner to scan a target that is inserted into a hole formed in the workpiece, and the target includes a shaft coupled to the hole in the workpiece and the target comprises a cylinder body extending from the shaft. The shaft couples to the hole and the cylinder body extends from the hole such that a centerline of the hole is collinear with a longitudinal axis of the cylinder body. The method also comprises receiving scan data, from the scanner, including a plurality of data points representative of a surface area of the cylinder body of the target and data points representative of a surrounding workpiece, and interpolating, by a processor, the longitudinal axis of the cylinder body based on fitting the plurality of data points representative of the surface area of the cylinder body to a cylindrical shape. The longitudinal axis of the cylinder body extends longitudinally along the target. The method also comprises determining, by the processor, a position of the hole and a vector of the hole formed in the workpiece based on an intersection of the longitudinal axis of the cylinder body and a plane of a surface of the workpiece, and generating, by the processor, a three-dimensional (3D) model of at least a portion of the workpiece using the position of the hole and the vector of the hole formed in the workpiece.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 2 illustrates a side view of the target, according to an example embodiment.

FIG. 3 illustrates a wireframe side view of the target, according to an example embodiment.

FIG. 4 illustrates an isometric view of the target from a bottom perspective, according to an example embodiment.

FIG. 5 illustrates an isometric view of the target from a top perspective, according to an example embodiment.

FIG. 6 illustrates a top view of the target, according to an example embodiment.

FIG. 7 illustrates a bottom view of the target, according to an example embodiment.

FIG. 8 illustrates a side view of an additional example of the target, according to an example embodiment.

FIG. 9 illustrates a wireframe side view of the additional example of the target, according to an example embodiment.

FIG. 10 illustrates an isometric view of the additional example of the target from a bottom perspective, according to an example embodiment.

FIG. 11 illustrates an isometric view of the additional example of the target from a top perspective, according to an example embodiment.

FIG. 12 illustrates a top view of the additional example of the target, according to an example embodiment.

FIG. 13 illustrates a bottom view of the additional example of the target, according to an example embodiment.

FIG. 14 illustrates a side view of yet another example of the target, according to an example embodiment.

FIG. 15 illustrates a wireframe side view of the other example of the target, according to an example embodiment.

FIG. 16 illustrates an isometric view of the other example of the target from a bottom perspective, according to an example embodiment.

FIG. 17 illustrates an isometric view of the other example of the target from a top perspective, according to an example embodiment.

FIG. 18 illustrates a top view of the other example of the target, according to an example embodiment.

FIG. 19 illustrates a bottom view of the other example of the target, according to an example embodiment.

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

In examples described below, a target is used as a fiducial for generating location information pertaining to a hole formed in a workpiece. A scanner provides a light pattern and generates a surface scan of everything in a field of view from camera(s), and a 3D surface is generated from received data. Using data from the surface scan, the target can be identified to generate a feature location.

Methods and systems for determining a position and a vector of a hole formed in a workpiece based on scanned data of the workpiece are described using the target. An example system includes the target for coupling to the hole formed in the workpiece, a scanner for projecting a light pattern onto the target and surrounding workpiece and for generating a plurality of data points representative of a surface area of a cylinder body of the target, and a processor for receiving the plurality of data points generated by the scanner and generating a three-dimensional (3D) model of at least a portion of the workpiece. The processor determines a position and a vector of the hole formed in the workpiece for the 3D model based on the plurality of data points representative of the surface area of the cylinder body.

Figure 1:
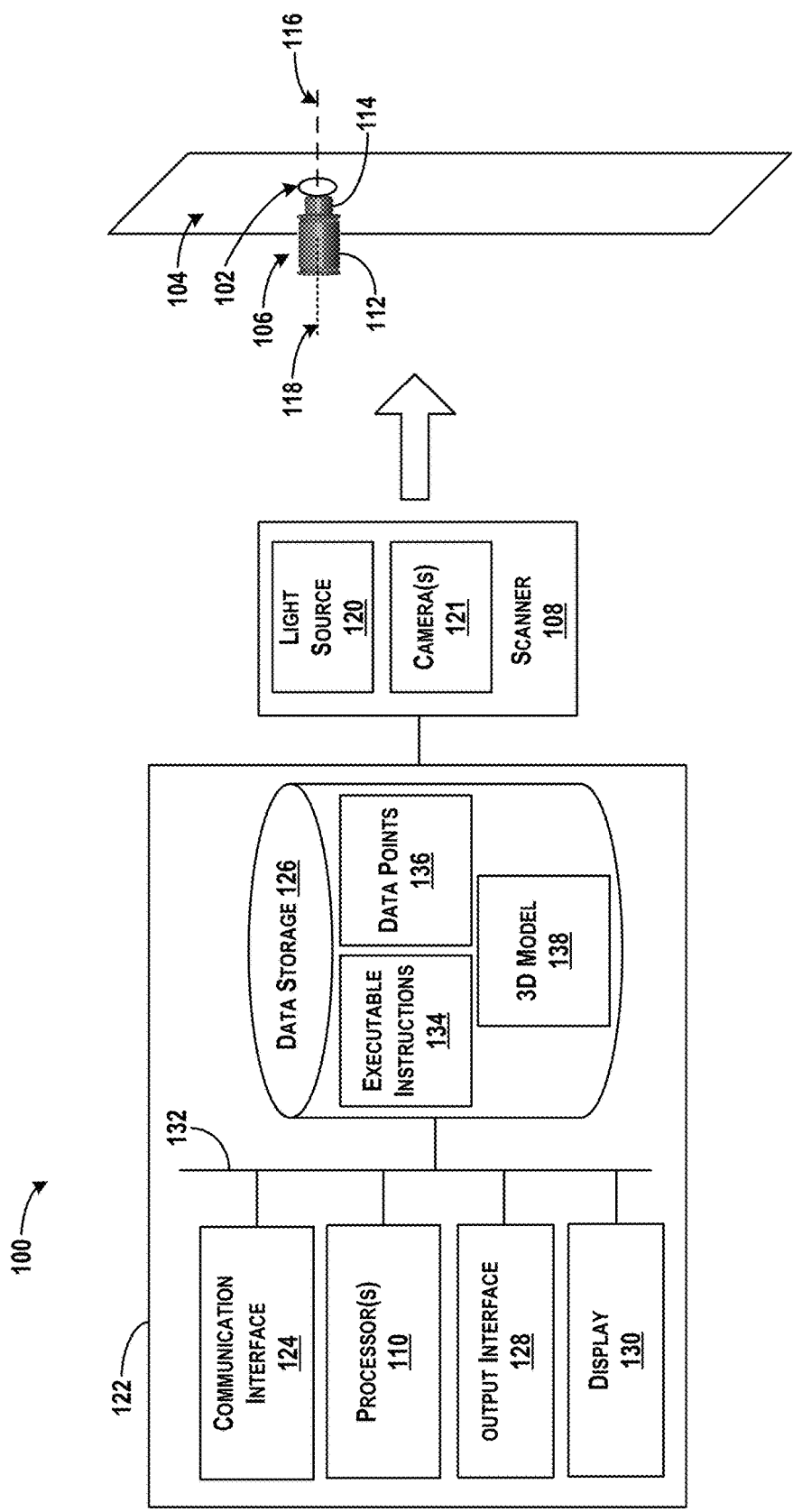
FIG. 1 illustrates an example system for determining a position and a vector of a hole formed in a workpiece based on scanned data of the workpiece.

Referring now to the figures, FIG. 1 illustrates an example system 100 for determining a position and a vector of a hole 102 formed in a workpiece 104 based on scanned data of the workpiece 104. The system 100 includes a target 106 for coupling to the hole 102 formed in the workpiece 104, a scanner 108 for projecting a light pattern onto the target 106 and surrounding workpiece 104, and one or more processor(s) 110 for receiving data from the scanner 108 and generating a three-dimensional (3D) model of at least a portion of the workpiece 104.

Within examples, the target 106 is used to determine the location and vector of the hole 102 drilled in the workpiece 104. The location and vector of the hole 102 is useful to determine the 3D model of the workpiece 104, and the 3D model can be used to virtually assembly parts that are scanned separately, for example.

The target 106 includes a cylinder body 112 extending from a shaft 114, and the shaft 114 couples to the hole 102 with the cylinder body 112 extending from the hole 102 such that a centerline 116 of the hole 102 is collinear with a longitudinal axis 118 of the cylinder body 112. The target 106 is inserted into the workpiece 104 to extend from the hole 102 outward with respect to a surface of the workpiece 104.

The cylinder body 112 of the target 106 provides an increased surface area to determine the longitudinal axis 118 that is collinear to the centerline 116 of the hole 102. Some standard vector targets may create uncertainty in location due to the fact that standard targets generally use only two points to generate a vector. However, example targets described herein using the cylinder body 112 enable use of many points to generate a vector.

The scanner 108 includes a light source 120 to generate the light pattern onto the target 106, and one or more camera(s) to capture images of the workpiece 104 and/or reflected light. In one example, the scanner 108 is a non-contact structure light scanner that measures many points per scan. Example scanners include an ATOS structured light scanner, or other surface scanners, and 3D scanners.

The light source 120 can include a single light emitting diode (LED), or multiple LEDs, for example. In addition, the scanner 108 can include many camera(s) 121, such as three cameras to capture a multi-view of the workpiece 104. The scanner 108 generates a plurality of data points representative of a surface area of the cylinder body 112. The plurality of data points may include a 3D point cloud of the workpiece 104 with the target 106 inserted.

The processor(s) 110 receive the plurality of data points representative of the surface area of the cylinder body 112 generated by the scanner 108 and generate the 3D model of at least a portion of the workpiece 104. The processor(s) 110 determine a position of the hole 102 and a vector of the hole 102 formed in the workpiece 104 for the 3D model based on the plurality of data points representative of the surface area of the cylinder body 112.

The system 100 is shown to include a computing device 122 that has the processor(s) 110, and also a communication interface 124, data storage 126, an output interface 128, and a display 130 each connected to a communication bus 132. The computing device 122 may also include hardware to enable communication within the computing device 122 and between the computing device 122 and other devices (not shown). The hardware may include transmitters, receivers, and antennas, for example.

In some examples, the computing device 122 and the scanner 108 may be combined as a single device.

The communication interface 124 may be a wireless interface and/or one or more wireline interfaces that allow for both short-range communication and long-range communication to one or more networks or to one or more remote devices. Such wireless interfaces may provide for communication under one or more wireless communication protocols, such as Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 124 may be configured to receive input data from one or more devices, such as the scanner 108, and may also be configured to send output data to other devices.

The data storage 126 may include or take the form of one or more computer-readable storage media that can be read or accessed by the processor(s) 110. The computer-readable storage media can include volatile and/or non-volatile storage components, such as optical, magnetic, organic or other memory or disc storage, which can be integrated in whole or in part with the processor(s) 110. The data storage 126 is considered non-transitory computer readable media. In some embodiments, the data storage 126 can be implemented using a single physical device (e.g., one optical, magnetic, organic or other memory or disc storage unit), while in other embodiments, the data storage 126 can be implemented using two or more physical devices.

The data storage 126 thus is a non-transitory computer readable storage medium, and executable instructions 134 are stored thereon. The instructions 134 include computer executable code. When the instructions 134 are executed by the processor(s) 110, the processor(s) 110 are caused to perform functions. Such functions include causing the scanner 108 to scan the target 106 that is inserted into the hole 102 formed in the workpiece 104, receiving scan data from the scanner 108, interpolating the longitudinal axis 118 of the cylinder body 112 based on fitting the scanned data to a cylindrical shape, determining a position of the hole 102 and a vector of the hole 102 formed in the workpiece 104 based on an intersection of the longitudinal axis 118 of the cylinder body 112 and a plane of a surface of the workpiece 104, and generating the 3D model of at least a portion of the workpiece 104 using the position of the hole 102 and the vector of the hole 102 formed in the workpiece 104. Additional details of such functions are described more fully below.

The processor(s) 110 may be a general-purpose processor or a special purpose processor (e.g., digital signal processors, application specific integrated circuits, etc.). The processor(s) 110 may receive inputs from the scanner 108, and process the inputs to generate outputs that are stored in the data storage 126 and output to the display 130. For example, the data points 136 received from the scanner 108 and the 3D model 138 generated by the processor(s) 110 may be stored in the data storage 126. The processor(s) 110 can be configured to execute the executable instructions 134 (e.g., computer-readable program instructions) that are stored in the data storage 126 and are executable to provide the functionality of the system 100 described herein.

The output interface 128 outputs information to the display 130 or to other components as well. Thus, the output interface 128 may be similar to the communication interface 124 and can be a wireless interface (e.g., transmitter) or a wired interface as well.

FIGS. 2-7 illustrate example views of the target 106, according to an example embodiment. FIG. 2 illustrates a side view of the target 106, FIG. 3 illustrates a wireframe side view of the target 106, FIG. 4 illustrates an isometric view of the target 106 from a bottom perspective, FIG. 5 illustrates an isometric view of the target 106 from a top perspective, FIG. 6 illustrates a top view of the target 106, and FIG. 7 illustrates a bottom view of the target 106.

FIG. 2 illustrates the shaft 114 having a centerline 140 extending longitudinally along the shaft 114, and the shaft couples to the hole 102 such that the centerline 116 of the hole 102 is collinear with the centerline 140 of the shaft 114. The cylinder body 112 extends from the shaft 114 such that the centerline 118 of the cylinder body 112 aligns with the centerline 140 of the shaft 114, and the centerline 118 of the cylinder body 112 extends longitudinally along the cylinder body 112 between two parallel circular faces 142 and 144. Thus, the cylinder body 112 is a full cylinder body including the two parallel circular faces 142 and 144 having volume 146 therebetween.

The target 106 also includes a first ring structure 148 coupled to an end of the cylinder body 112 and including an undercut 150 on a portion connected to the cylinder body 112, and a second ring structure 152 positioned between the cylinder body 112 and the shaft 114 and including an undercut 154 on a portion connected to the cylinder body 112. The first ring structure 148 and the second ring structure 152 protect surfaces of the target 106, and can have flared edges or raised features, or be wider or shorter depending on an application or use of the target 106.

FIG. 3 illustrates that the target 106 includes a cavity 156 within the cylinder body 112. The cavity 156 is an opening that is shown to extend fully through a center of the target 106. However, in other examples, the cavity 156 may not extend fully through the target 106, such as shown, for example, in FIG. 15.

FIG. 4 illustrates that an end of the target 106 includes an opening 158 to the cavity 156. FIG. 5 illustrates that the shaft 114 may also include an opening 160 in an example in which the cavity 156 extends fully through the target 106.

FIG. 6 illustrates a top view of the target 106 showing the opening 160 in the shaft 114. In examples where the cavity 156 does not extend fully through the target 106, the shaft 114 may not include the opening 160, such as for example, shown in FIG. 18. FIG. 7 illustrates a bottom view of the target 106 showing the opening 158 in the end of the cylinder body 112.

FIGS. 8-13 illustrate additional views of another example of the target 106 having a different dimension, according to an example embodiment. FIG. 8 illustrates a side view of the target 106, FIG. 9 illustrates a wireframe side view of the target 106, FIG. 10 illustrates an isometric view of the target 106 from a bottom perspective, FIG. 11 illustrates an isometric view of the target 106 from a top perspective, FIG. 12 illustrates a top view of the target 106, and FIG. 13 illustrates a bottom view of the target 106.

FIGS. 14-19 illustrate additional views of yet another example of the target 106, according to an example embodiment. FIG. 14 illustrates a side view of the target 106, FIG. 15 illustrates a wireframe side view of the target 106, FIG. 16 illustrates an isometric view of the target 106 from a bottom perspective, FIG. 17 illustrates an isometric view of the target 106 from a top perspective, FIG. 18 illustrates a top view of the target 106, and FIG. 19 illustrates a bottom view of the target 106.

The target 106 can be sized as needed for an application, and the shaft 114 is then dimensioned for receipt into the hole 102. As some examples, the target 106 may be about an inch in length, or within a range of about 0.5 to about 5 inches depending on an application or use. The size of the target 106 can be made smaller or larger, however, depending on desired uses, and these ranges are given as examples only. As shown in the figures, the shaft 114 has a circumference smaller than a circumference of the cylinder body 112. For larger holes, in some examples, the shaft 114 can be configured to have a larger circumference than the circumference of the cylinder body 112.

The target 106 can be configured or manufactured to comprise a material of that of the workpiece 104 into which the target 106 is inserted to enable high quality scanning. In some examples, an outer surface of the cylinder body 112 of the target 106 includes a non-reflective coating such that light from the scanner is not reflected back. Example materials that can be used for the target 106 include steel, zinc-phosphate, titanium, and aluminum. All components of the target 106 can be comprised of the same material.

In operation, the target 106 is used as a fiducial for generating location information pertaining to the hole 102. The scanner 108 provides a light pattern and generates a surface scan of everything in a field of view from the camera(s) 121, and builds a 3D surface from received data. Using data from the surface scan, the target 106 can be identified to generate a feature location.

In operation, the scanner 108 provides a light pattern on surfaces of the target 106 and the workpiece 104, and generates the data points (e.g., point cloud) as representative of the components. The target 106, having a cylindrical shape, provides an increased scanning area to allow the scanner 108 to establish a centerline even if the target 106 is partially obstructed (as compared to using a flat circular target, for example). Further, the target 106 with the cylindrical shape is useable in any rotational orientation.

Figure 20:
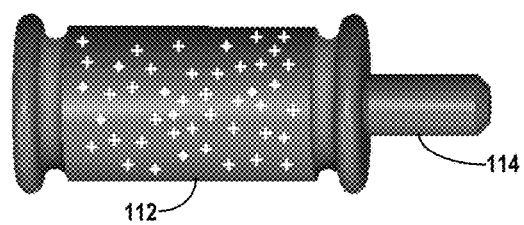
FIG. 20 illustrates an example of data points of the target generated by the scanner, according to an example embodiment.

FIG. 20 illustrates an example of data points of the target 106 generated by the scanner 108, according to an example embodiment. The increased scanning area of the target 106 enables increased data points to be generated to interpolate the centerline of the hole 116. As an example shown in FIG. 20, the "+" indicate various points on a surface of the cylinder body 112 at which data points are generated. In some examples, many data points can be generated, such as in a range of a few hundred or more (e.g., 600 data points). By using a larger number of data points, uncertainty in determination of the vector of the hole 102 is reduced.

The cylinder body 112 provides a surface to generate data points, and the processor(s) 110 interpolate the longitudinal axis 118 of the cylinder body 112 based on fitting the plurality of data points to a cylindrical shape. The longitudinal axis 118 of the cylinder body 112 extends longitudinally along the target 102. Geometric shape fitting can be used to fit the received data points to a known model of a cylindrical shape.

Figure 21:
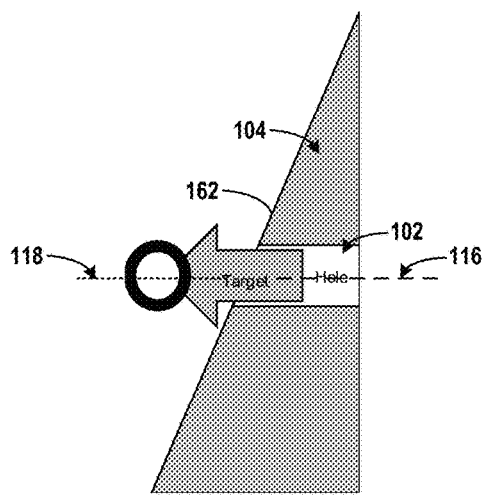
FIG. 21 illustrates an example diagram to determine a position of the hole, according to an example embodiment.

FIG. 21 illustrates an example diagram to determine a position of the hole 102, according to an example embodiment. Once the model of the target 106 is determined, the processor(s) 110 determine the position of the hole 102 by determining an intersection of the longitudinal axis 118 of the cylinder body 112 and a plane 162 of a surface of the workpiece 104.

Figure 22:
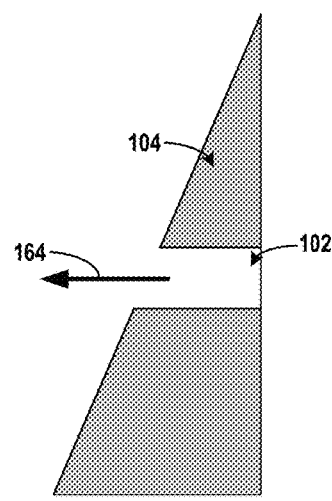
FIG. 22 illustrates an example of the hole in the workpiece formed such that a vector is determined, according to an example embodiment.

In some examples, the processor(s) 110 determine the position and the vector of the hole 102 based on an intersection of the centerline or longitudinal line 118 of the cylinder body 112 aligns with the centerline 140 of the shaft 114. In other examples, the processor(s) 110 determine the vector of the hole 102 by determining the longitudinal axis 118 of the cylinder body 112 based on the plurality of data points, and the vector of the hole 102 matches the longitudinal axis 118. FIG. 22 illustrates an example of the hole 102 in the workpiece 104 formed such that a vector 164 is determined, according to an example embodiment. The vector 164 is not normal to the plane 162 of the surface of the workpiece 104, which may be an assumed orientation of the vector. Thus, use of the target 106 enables determination of the vector 164 in an accurate manner.

Figure 23:
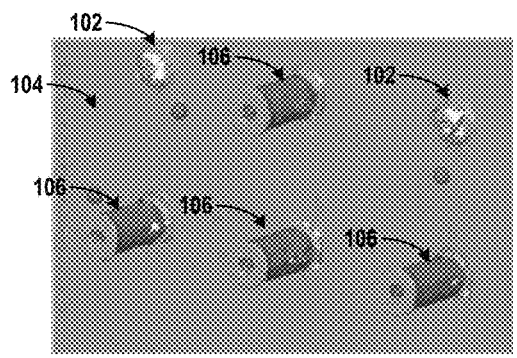
FIG. 23 illustrates an example of a 3D model, generated by the processor(s) of at least a portion of the workpiece using the position of the hole and the vector of the hole formed in the workpiece, according to an example embodiment.

FIG. 23 illustrates an example of a 3D model, generated by the processor(s) 110 of at least a portion of the workpiece 104 using the position of the hole 102 and the vector of the hole formed in the workpiece 104, according to an example embodiment. Also shown are models of the target 106 inserted into holes.

Figure 24:
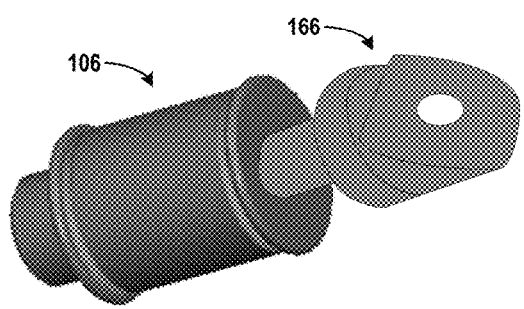
FIG. 24 illustrates an example of using multiple targets, according to an example embodiment.

Within some examples, it can be useful to use multiple targets to pinpoint a location of the hole 102. FIG. 24 illustrates an example of using multiple targets, according to an example embodiment. In FIG. 24, a single-point target 166 is inserted into the cavity 156 of the cylinder body 112 of the target 106, and the processor(s) 110 receive data representative of the single-point target 166 and determine a position of the target 106 based on the data representative of the single-point target 166. The single-point target 166 can be useful to filter surface data based on a single point of data seen from an end viewpoint. The lower accuracy single point target 166 can be used to find the high accuracy cylindrical target 106.

Figure 25:
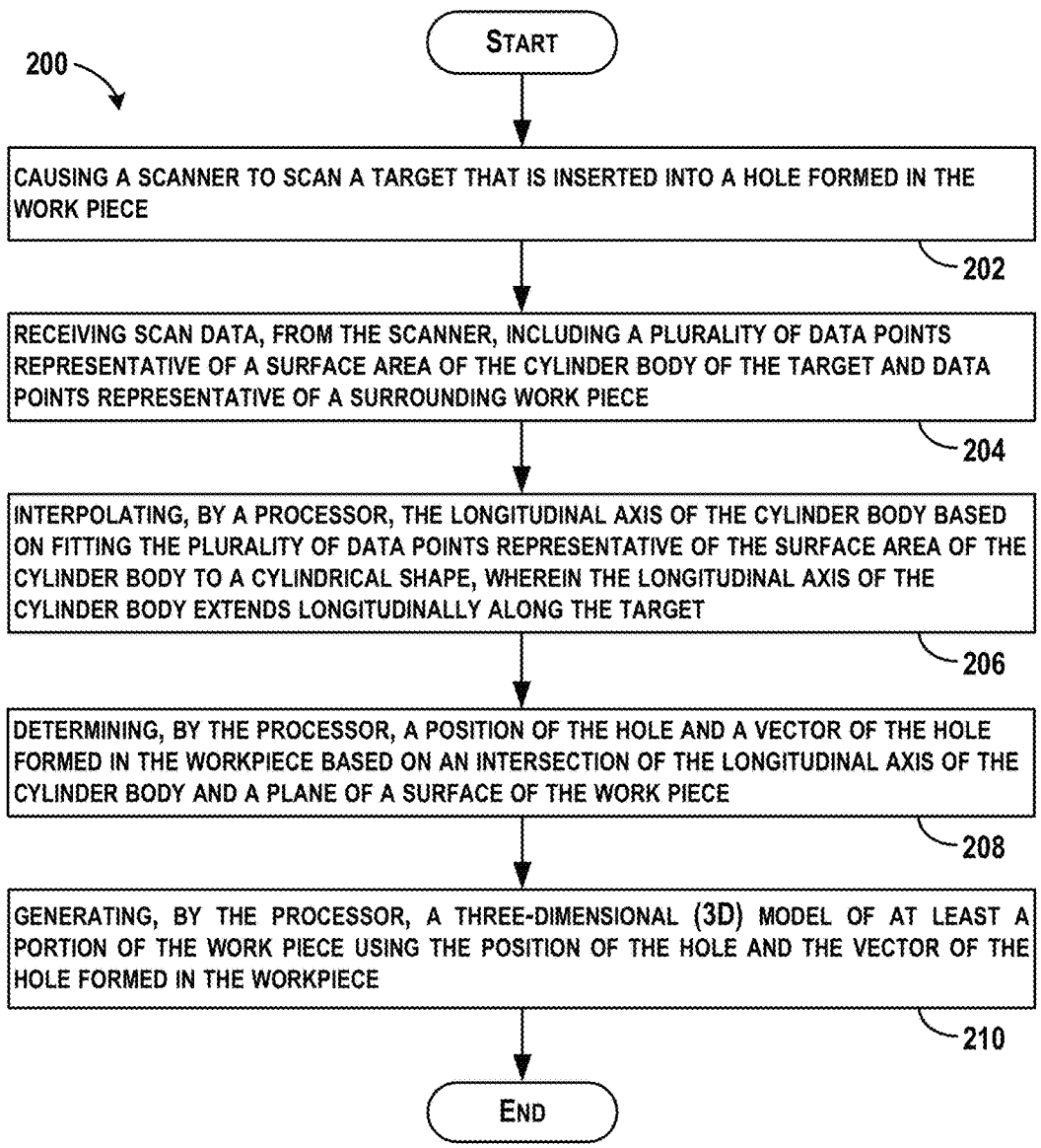
FIG. 25 shows a flowchart of an example method for determining a position and a vector of the hole formed in the workpiece based on scanned data of the workpiece, according to an example embodiment.

FIG. 25 shows a flowchart of an example method 200 for determining a position and a vector of the hole 102 formed in the workpiece 104 based on scanned data of the workpiece 104, according to an example embodiment. Method 200 shown in FIG. 25 presents an embodiment of a method that could be used or performed by the system 100 or components of the system 100, shown in FIG. 1, for example. Further, devices or systems may be used or configured to perform logical functions presented in FIG. 25. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-210. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes causing the scanner 108 to scan the target 106 that is inserted into the hole 102 formed in the workpiece 104. As described, the target 106 includes the shaft 114 coupled to the hole 102 in the workpiece 104 and the target 106 comprises the cylinder body 112 extending from the shaft 114. The shaft 114 couples to the hole 102 and the cylinder body 112 extends from the hole 102 such that the centerline 116 of the hole 102 is collinear with the longitudinal axis 118 of the cylinder body 112. The processor(s) 110 may send instructions to the scanner 108 to scan the target 106 and workpiece 104.

At block 204, the method 200 includes receiving scan data, from the scanner 108, including a plurality of data points representative of a surface area of the cylinder body 112 of the target 106 and data points representative of a surrounding workpiece 104.

At block 206, the method 200 includes interpolating, by the processor(s) 110, the longitudinal axis 118 of the cylinder body 112 based on fitting the plurality of data points representative of the surface area of the cylinder body 112 to a cylindrical shape, and the longitudinal axis 118 of the cylinder body 112 extends longitudinally along the target 106.

At block 208, the method 200 includes determining, by the processor(s) 110, a position of the hole 102 and a vector of the hole 102 formed in the workpiece 104 based on an intersection of the longitudinal axis 118 of the cylinder body 112 and the plane 162 of a surface of the workpiece 104.

At block 210, the method 200 includes generating, by the processor(s) 110, a three-dimensional (3D) model of at least a portion of the workpiece 104 using the position of the hole 102 and the vector of the hole 102 formed in the workpiece 104. The 3D model may be generated using the point cloud data received from the scanner 108.

Figure 26:
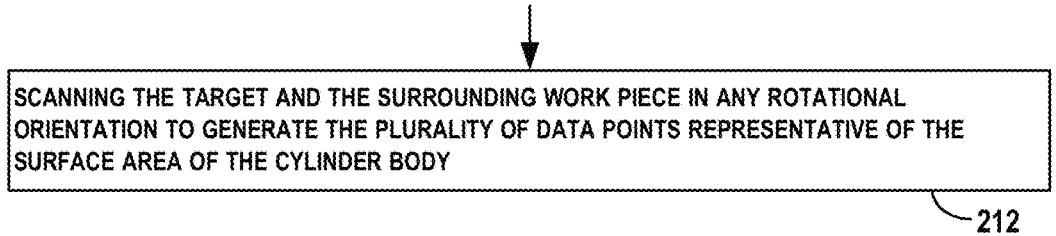
FIG. 26 shows a flowchart of an example method for use with the method shown in FIG. 25, according to an example embodiment.

FIG. 26 shows a flowchart of an example method for use with the method 200 shown in FIG. 25, according to an example embodiment. At block 212, additional functions include scanning the target 106 and the surrounding workpiece 104 in any rotational orientation to generate the plurality of data points representative of the surface area of the cylinder body 112. In this example, the vector of the hole 102 can be established by scanning from any sides due to the target 106 having a cylindrical shape and body.

Figure 27:
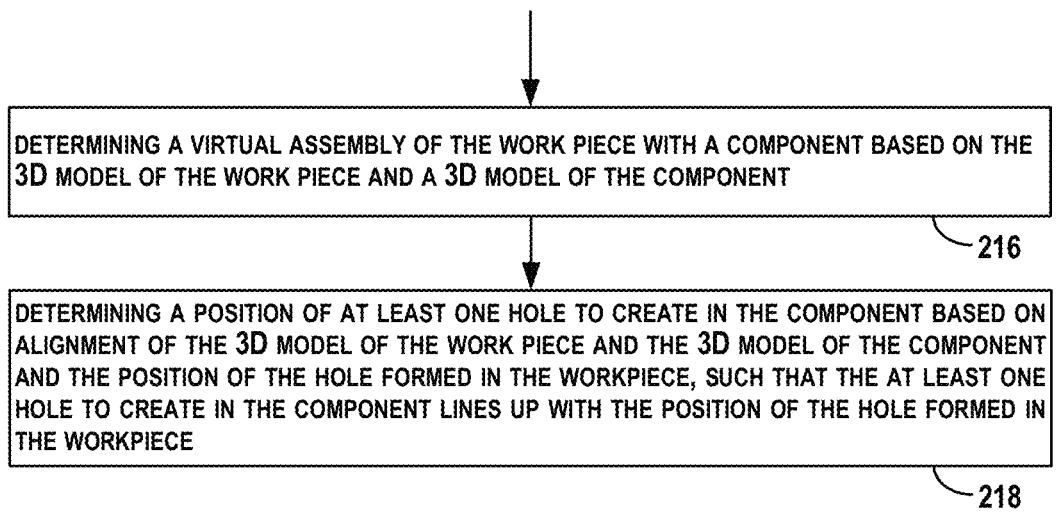
FIG. 27 shows a flowchart of another example method for use with the method shown in FIG. 25, according to an example embodiment.

FIG. 27 shows a flowchart of another example method for use with the method 200 shown in FIG. 25, according to an example embodiment. At block 216, additional functions include determining a virtual assembly of the workpiece 104 with a component based on the 3D model of the workpiece 104 and a 3D model of the component, and at block 218, determining a position of at least one hole to create in the component based on alignment of the 3D model of the workpiece 104 and the 3D model of the component and the position of the hole 102 formed in the workpiece 104. In this example, the hole to be created in the component is determined to line up with the position of the hole 102 formed in the workpiece 104.

In this example, because components are generally scanned separately, a 3D model of individual components are created. Once a hole location is known or determined for one component, a determination of where to place holes in other components can be made so as to virtually assemble the components together. The components can be virtually assembled prior to an actual build process, and verification of the design configurations can be made.

Figure 28:
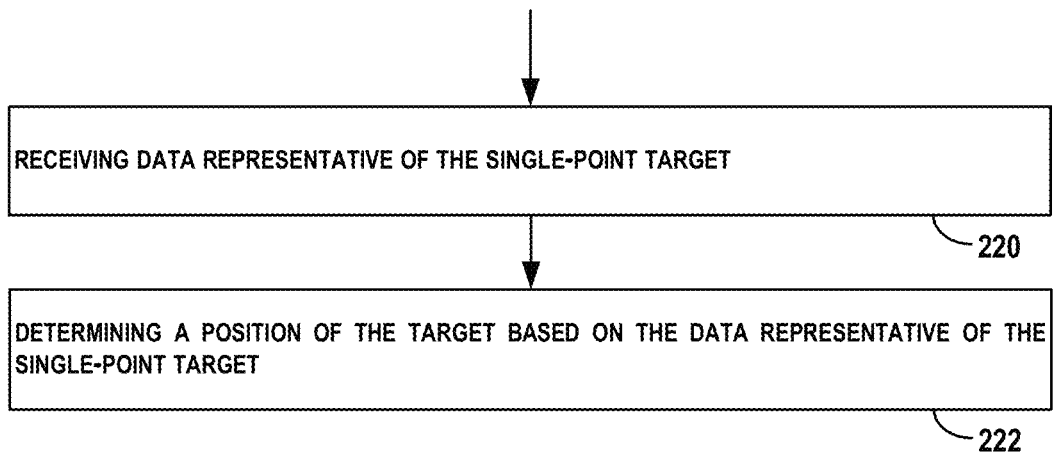
FIG. 28 shows a flowchart of another example method for use with the method shown in FIG. 25, according to an example embodiment.

FIG. 28 shows a flowchart of another example method for use with the method 200 shown in FIG. 25, according to an example embodiment. In this example, the single-point target 166 is inserted into the cavity 156 of the cylinder body 112 of the target 106, and additional functions include receiving data representative of the single-point target 166 at block 220, and determining a position of the target 106 based on the data representative of the single-point target 166, at block 222.

Example methods and systems described can improve system accuracy and usability of high accuracy systems so as to reduce build time, and increase production efficiency.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for determining a position and a vector of a hole formed in a workpiece based on scanned data of the workpiece, the system comprising:
   a target for coupling to the hole formed in the workpiece, the target comprising a cylinder body extending from a shaft, wherein the shaft couples to the hole and the cylinder body extends from the hole such that a centerline of the hole is collinear with a longitudinal axis of the cylinder body;
   scanner for projecting a light pattern onto the target and surrounding workpiece and for generating a plurality of data points representative of a surface area of the cylinder body; and
   a processor for receiving the plurality of data points representative of the surface area of the cylinder body generated by the scanner and generating a three-dimensional (3D) model of at least a portion of the workpiece, the processor determining a position of the hole and a vector of the hole formed in the workpiece for the 3D model based on the plurality of data points representative of the surface area of the cylinder body, wherein the processor determines the position of the hole by determining an intersection of the longitudinal axis of the cylinder body and a plane of a surface of the workpiece.

2. The system of claim 1, wherein the cylinder body includes a cavity.

3. The system of claim 1, wherein the cylinder body is a full cylinder body including two parallel circular faces having volume therebetween.

4. The system of claim 1, wherein the shaft is dimensioned for receipt into the hole.

5. The system of claim 1, wherein an outer surface of the cylinder body includes a non-reflective coating.

6. The system of claim 1, wherein the target comprises a material of that of the workpiece into which the target is inserted.

7. The system of claim 1, wherein the target extends from the hole outward with respect to a surface of the workpiece.

8. The system of claim 1, wherein the target further comprises a first ring structure coupled to an end of the cylinder body and a second ring structure between the cylinder body and the shaft.

9. The system of claim 8, wherein the first ring structure and the second ring structure include an undercut on a portion connected to the cylinder body.

10. The system of claim 1, wherein the processor determines the vector of the hole by determining the longitudinal axis of the cylinder body based on the plurality of data points.

11. The system of claim 1, wherein the processor interpolates the longitudinal axis of the cylinder body based on fitting the plurality of data points to a cylindrical shape, wherein the longitudinal axis of the cylinder body extends longitudinally along the target.

12. The system of claim 1, further comprising:
   a single-point target inserted into a cavity of the cylinder body of the target,
   wherein the processor receives data representative of the single-point target and determines a position of the target based on the data representative of the single-point target.

13. A target for coupling to a hole formed in a workpiece and for use with a scanner in determining a position and a vector of the hole in scanned data, the target comprising:
   a shaft for coupling to the hole and having a centerline extending longitudinally along the shaft, wherein the shaft couples to the hole such that a centerline of the hole is collinear with the centerline of the shaft;
   a cylinder body extending from the shaft such that a centerline of the cylinder body aligns with the centerline of the shaft, wherein the cylinder body includes two parallel circular faces having volume therebetween, and wherein the cylinder body includes a cavity, and wherein the centerline of the cylinder body extends longitudinally along the cylinder body between the two parallel circular faces, wherein the position and the vector of the hole is based on an intersection of the centerline of the cylinder body with the centerline of the shaft;
   a first ring structure coupled to an end of the cylinder body and including an undercut on a portion connected to the cylinder body; and
   a second ring structure positioned between the cylinder body and the shaft, and including an undercut on a portion connected to the cylinder body.

14. The target of claim 13, wherein an outer surface of the cylinder body includes a non-reflective coating.

15. The target of claim 13, wherein the target comprises a material of that of the workpiece into which the target is inserted.

16. A method for determining a position and a vector of a hole formed in a workpiece based on scanned data of the workpiece, the method comprising:
   causing a scanner to scan a target that is inserted into a hole formed in the workpiece, wherein the target includes a shaft coupled to the hole in the workpiece and the target comprises a cylinder body extending from the shaft, wherein the shaft couples to the hole and the cylinder body extends from the hole such that a centerline of the hole is collinear with a longitudinal axis of the cylinder body;
   receiving scan data, from the scanner, including a plurality of data points representative of a surface area of the cylinder body of the target and data points representative of a surrounding workpiece;
   interpolating, by a processor, the longitudinal axis of the cylinder body based on fitting the plurality of data points representative of the surface area of the cylinder body to a cylindrical shape, wherein the longitudinal axis of the cylinder body extends longitudinally along the target;
   determining, by the processor, a position of the hole and a vector of the hole formed in the workpiece based on an intersection of the longitudinal axis of the cylinder body and a plane of a surface of the workpiece; and
   generating, by the processor, a three-dimensional (3D) model of at least a portion of the workpiece using the position of the hole and the vector of the hole formed in the workpiece.

17. The method of claim 16, further comprising:
   scanning the target and the surrounding workpiece in any rotational orientation to generate the plurality of data points representative of the surface area of the cylinder body.

18. The method of claim 16, further comprising:
   determining a virtual assembly of the workpiece with a component based on the 3D model of the workpiece and a 3D model of the component; and
   determining a position of at least one hole to create in the component based on alignment of the 3D model of the workpiece and the 3D model of the component and the position of the hole formed in the workpiece, such that the at least one hole to create in the component lines up with the position of the hole formed in the workpiece.

19. The method of claim 16, wherein a single-point target is inserted into a cavity of the cylinder body of the target, and the method further comprises:

receiving data representative of the single-point target; and determining a position of the target based on the data representative of the single-point target.

* * * * *